Oct. 19, 1943.    L. D. BURTENSHAW    2,332,368
PROCESS OF SOLDERING
Filed Aug. 2, 1940    2 Sheets-Sheet 1
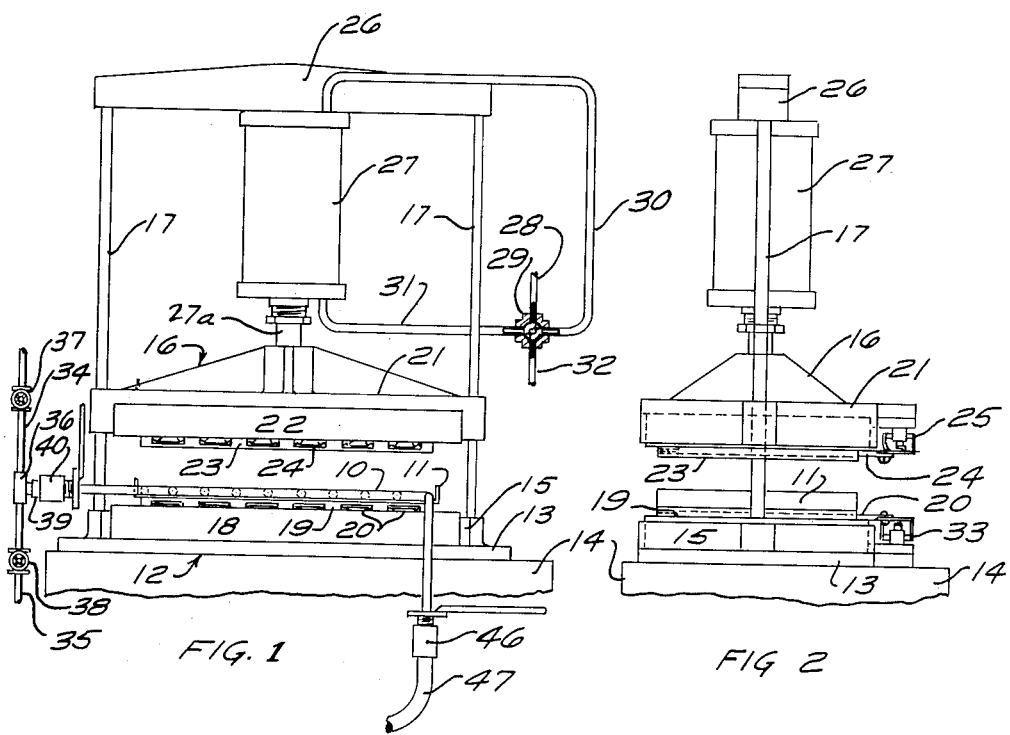
FIG. 1    FIG. 2
FIG. 4
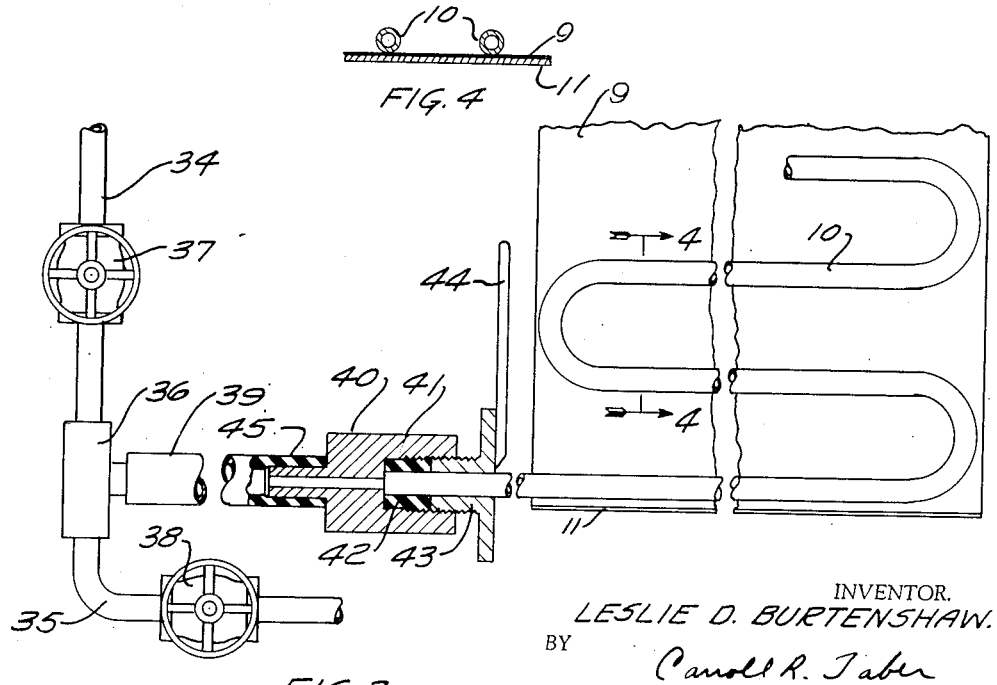
FIG. 3
INVENTOR.
LESLIE D. BURTENSHAW.
BY Carroll R. Taber
ATTORNEY.

Oct. 19, 1943.  L. D. BURTENSHAW  2,332,368
PROCESS OF SOLDERING
Filed Aug. 2, 1940  2 Sheets-Sheet 2

INVENTOR.
LESLIE D. BURTENSHAW
BY
Carroll R. Taber
ATTORNEY.

Patented Oct. 19, 1943

2,332,368

UNITED STATES PATENT OFFICE 2,332,368

PROCESS OF SOLDERING

Leslie D. Burtenshaw, Greenville, Mich., assignor to Gibson Electric Refrigerator Corporation, Greenville, Mich., a corporation of Michigan Application August 2, 1940, Serial No. 349,701

3 Claims. (Cl. 113—112)

This invention relates to processes of soldering a metal tube to another metal part.

The principal object of the invention is to provide a process of soldering a metal tube to a metal plate or another tube which is simple, economical, and which may be rapidly performed.

Another object is the provision of a process of that character in which cooling and solidification of the melted solder is materially hastened.

Briefly the invention resides in a process of soldering two metal parts, at least one of which is a tube, together, which comprises clamping the parts in proper relationship with solder between them, heating at least one of the parts to a temperature high enough to melt the solder, passing water or other suitable coolant through the tube to solidify the solder, and thereafter expelling the coolant from the tube with compressed air.

The invention is particularly adapted to the rapid production of articles such as evaporators for refrigerators, wherein a coiled tube is soldered to a metal plate, or two tubes are soldered together in tangent relationship.

In the drawings:

Figure 1 is a front elevational view of apparatus forming one embodiment of the invention;

Figure 2 is a side elevational view of the apparatus shown in Figure 1;

Figure 3 is an enlarged view of a portion of the apparatus shown in Figures 1 and 2, a portion thereof being shown in cross-section, including a fragmentary plan view of an evaporator tube and plate.

Figure 4 is a fragmentary cross-sectional view taken on substantially the line 4—4 of Figure 3;

Figure 5:
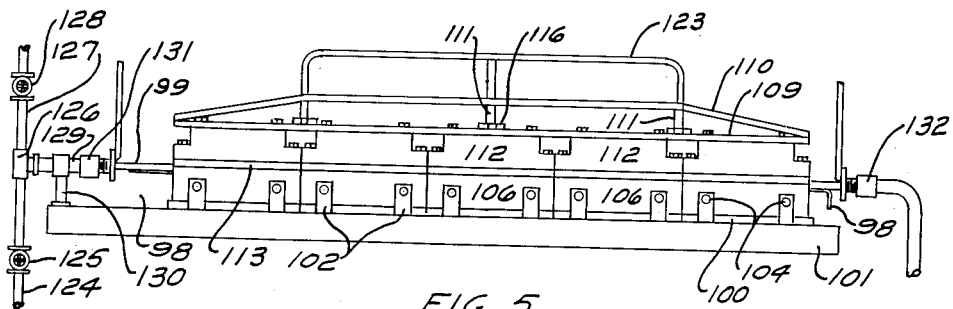
Figure 5 is a front elevational view of another form of apparatus embodying the invention.

Figures 1 to 3 illustrate apparatus designed especially for soldering a metal tube 10 to a metal plate 11 to form an evaporator for a refrigerator. The plate 11 is covered with a sheet of solder 9. The tube 10 is bent into the desired serpentine form and laid upon the solder. The plate, solder, and tube are placed in an electric soldering jig which will now be described.

The jig includes a lower clamping member 12 and an upper clamping member 16. The lower clamping member comprises a cast iron base 13 secured to a table or bench 14. The base 13 has upright flanges 15 at each end. The flanges are provided with sockets to receive a pair of upright guide bars 17.

A bed of insulating material such as a block 18 of asbestos flour and cement is located on the base 13 between the flanges 15. A lower heating plate 19 of aluminum alloy is placed upon the insulating block 18 and secured thereto. The lower surface of the heating plate 19 is provided with a plurality of parallel slots extending from front to rear thereof which receive electric strip heaters 20. The strip heaters are wired to bus bars 33 on the rear of the base 13.

The upper clamping member 16 comprises a cast iron frame 21 having its ends drilled to slidably receive the guide bars 17. Attached to the lower surface of the frame 21 is a block of insulation 22. An upper heating plate 23 is fastened to the lower surface of the insulating block 22. The plate is slotted to receive a plurality of strip heaters 24 in a manner similar to the heating plate 18. The strip heaters 24 are electrically connected to bus bars 25 attached to the rear of the frame and the bus bars in turn are connected to an electric power line.

A cross beam 26 is attached to the upper ends of the guide bars 17. A double acting pneumatic cylinder 27 having a piston therein is supported therefrom. The piston rod 27a is connected to the top of the frame 21.

Compressed air for operating the piston within the cylinder 27 is supplied from a compressor (not shown) through a pipe 28 leading to a four way valve 29. A pipe 30 extends from the valve 29 to the upper end of the cylinder 27. Another pipe 31 leads from the valve 29 to the lower end of the cylinder 27. The valve is provided with a vent 32 to the atmosphere.

Adjacent the table 14 are two pipes 34 and 35 which are connected to a T 36. Pipe 34 is provided with a valve 37 and is connected to a supply of compressed air. Pipe 35 has a valve 38 and is connected to a water main.

The T 36 is connected by a flexible hose 39 to one end of a tube connector 40. The tube connector 40 has a cylindrical recess 41 in its opposite end which receives a rubber ring 42. The outer end of the recess is tapped to receive a threaded plug 43 having a handle 44 thereon. The plug and ring have openings therethrough, axially aligned with the recess 41, of a size to loosely fit the end of the tube 10. The body of the tube connector is drilled from the other end into the recess as at 45.

A similar tube connector 46 is provided for the other end of the tube 10. However, instead of being connected to a T it opens into a drain through a hose 47.

In operating the apparatus, and performing the process, the strip heaters 20 and 24 are energized with electric current to heat the heating plates 19 and 23. The temperature of the heating plates 19 and 23 is raised to the necessary level and maintained throughout the working day.

The metal plate 11 is coated on its upper side with flux, a layer of sheet solder 9 is laid on the plate, and the top surface of the solder is likewise fluxed. The tube 10, which has been previously bent to the desired serpentine form is laid upon the solder. The parts are then inserted between the two heating plates 19 and 23. The valve 29 is thrown to admit air through the pipe 30 to the upper end of the cylinder 27. The high pressure air moves the piston down bringing the upper clamping element and its heating plate 23 into contact with the tube 10. As soon as the heating plates 19 and 23 are in contact with the plate 11 and tube 10 respectively, the tube and plate will be heated, eventually melting the solder and causing it to adhere to the two parts.

While the plate 11 and tube 10 are being heated to the proper temperature, a matter of a few seconds, the ends of the tube 10 are connected to the tube connections 40 and 46. This operation consists of inserting the adjacent end of the tube 10 into the holes in the plug 43 and rubber ring 41. The plug 43 is then rotated by means of the handle 44 to compress the rubber ring axially. Axial compression of the ring 42 causes it to tightly engage the side wall of the tube 10 to form a fluid tight joint. The other end of the tube is connected to connector 46 in a like manner.

As soon as the solder has melted, valve 38 is opened, permitting water to flow through the tube 10. The water quickly cools the tube 10 and the solder between it and plate 11, solidifying the same.

The valve 29 is then thrown to its other position releasing the pressure on top of the piston and admitting air to the bottom of the cylinder 27 to move the piston up. The pressure is thus released from the heating plates and tube 10 and plate 11. Valve 38 is then closed and valve 37 opened. Air is admitted through the valve 37 to expel the water from the tube. When the tube is dry the air is shut off, and the tube disconnected from the tube connectors. The completed soldered assembly can then be removed from the jig.

The apparatus shown in Figures 5 to 8 is another device for performing the process of the invention. The particular device shown is especially adapted for soldering the capillary tube 98 to the suction tube 99 of a refrigerator cooling unit.

The device shown includes a lower clamping member and an upper clamping member. The lower clamping member comprises a base 100 mounted upon a table 101. The base 100 is a long narrow strip of iron or steel having a plurality of upstanding lugs 102 and 103 rigidly attached to its opposite sides. The lugs 102 are drilled and tapped to receive threaded screws 104. Secured to the rear edge of the base and extending rearwardly therefrom are three steel bars 105.

Figures 7, 8:
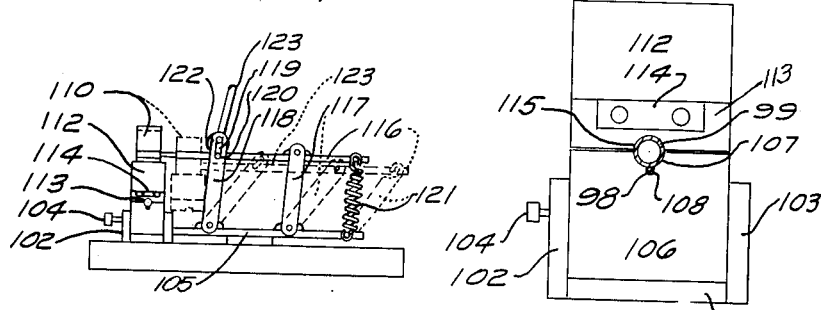
Figure 7 is an end elevational view of the apparatus shown in Figure 5.
Figure 8 is an end elevational view on an enlarged scale of a portion of the structure shown in Figure 5.
Figure 6:
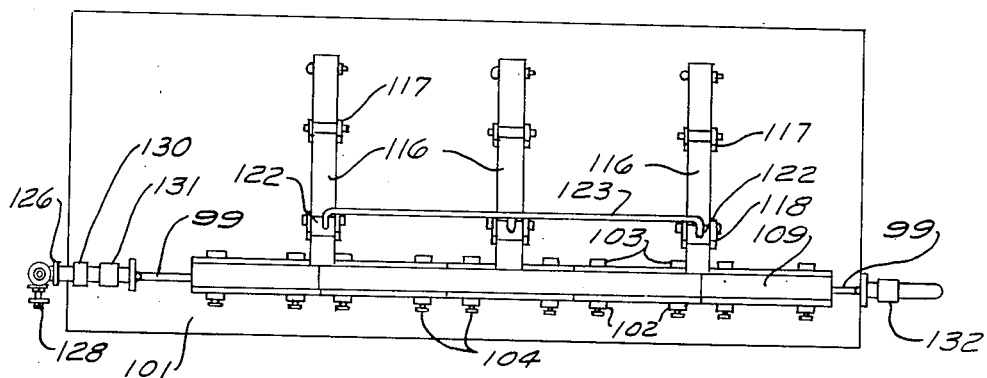
Figure 6 is a plan view of the apparatus shown in Figure 5.

Resting on the base 101 and clamped against the lugs 103 by the screws 104 are blocks of insulation 106. The blocks 106 are preferably made of asbestos flour and a suitable binder. A groove is cut in the top surface of each block 106. The grooves in the blocks are shaped as shown in Figure 8, consisting of semi-circular upper parts 107 to receive the tube 99, and narrow deeper parts 108 opening into the upper parts. The deeper parts 108 of the groove receive the tube 98.

The upper clamping member comprises a steel frame shaped like a truss in order to be of the requisite stiffness. The frame consists of flat steel strip 109 forming the lower chord of the frame, another strip 110 forming the upper chord, and three vertical struts 111. A plurality of blocks of insulation 112 are bolted to the lower chord 109 of the frame. Bolted onto the lower surfaces of the insulation are a like number of aluminum alloy heating plates 113. The tops of the plates 113 are milled out to provide a longitudinally extending groove for the reception of a plurality of electric strip heaters 114. The lower surfaces of the plates 113 have longitudinally extending and axially aligned semi-circular grooves 115 which cooperate with the grooves 107 to receive the tube 99.

Secured to the lower chord 109 of the frame, directly above the strips 105 are three similar strips 116. Each strip 116 is connected to the strip 105 directly below it by pairs of links 117 and 118, the links of each pair being arranged on opposite sides of the strips 105 and 116. Links 117 are pivoted to the strips at their respective ends. Links 118 are pivoted to strips 105 at their lower ends. The upper ends of links 118 are slotted as at 119 to slidably receive pins 120 projecting from opposite sides of strips 116. Tension springs 121 connect the rear ends of each pair of strips 105 and 116 to counterbalance the weight of the clamping member.

An eccentric 122 is pivotally connected between the upper ends of each pair of links 118 above the respective strip 116. An E shaped yoke 123 has an arm rigidly connected to each eccentric 122.

A water pipe 124 having a valve 125 is connected at one end to a T 126 and at its other end to a water main. An air pipe 127 having a valve 128 is connected at one end to another leg of T 126 and at its other end to a compressed air supply. The third leg of the T 126 is connected to a short rigid pipe 129 mounted on the table 101 by a bracket 130.

The end of the pipe 129 is threadedly connected to a tube connector 131 identical with the connector 40 previously described. The hole through the connector is axially aligned with the groove 107 in the lower clamping element.

Another tube connector 132, the same as tube connector 46, is located adjacent the other end of the table 101.

The operation of the device just described is as follows:

The current is first turned on in the strip heaters 114 and the heating plates 113 brought up to the required temperature. The upper clamping member is moved to its inoperative position shown in dotted lines in Figure 6. The capillary tube 98 is laid in the lower part 108 of the groove in the blocks 106. The tube 98 is fluxed. A strip of solder is then laid upon the upper surface of the tube 98. The solder is fluxed.

Then the suction tube 99 is placed in the upper part 107 of the groove. The left hand end of the tube 99 is inserted in the tube connector 131.

The frame of the upper clamping member is then grasped by the operator and lifted upwardly from its dotted line position, the pins 120 moving in the slots 119 to permit that lifting. The upper clamping member is then swung forward and lowered upon the blocks 106, so that the groove 115 fits over the tube 99 as in the solid line position of Figure 7. The yoke 123 is then rotated counter-clockwise to its solid line position. That movement rotates the eccentrics 122 into contact with the strips 116, and cams the upper clamping element into tight engagement with the tube 99.

The heat from heating plates 113 is transmitted to the tube 99 and thence to the solder, which it melts.

While the solder is being melted the tube connector 131 is tightened upon the tube 99 and the tube connector 132 is attached to the other end of the tube 99 and tightened.

Valve 125 is opened to permit water to flow through the tube 99 and solidify the solder. The valve 125 is then closed, valve 128 is opened, and compressed air admitted to expel the water from the tube.

The yoke 123 is then rotated clockwise to release the eccentrics 122 and the upper clamping element is swung back to its dotted line or inoperative position. The tubes 98 and 99 are removed from the tube connectors 131 and 132, and finally lifted out of the groove 107—108.

From the foregoing it will be evident that this invention provides a simple and quickly performed process of soldering a tube to a plate or another tube. No time is lost in waiting for the soldered parts to cool. Furthermore the soldered parts are clamped tightly in proper relationship until the solder has solidified.

The apparatus employed is simple, effective, and rapid in operation. It is particularly adapted to rapid production of the soldered articles because the operator can perform most of the operations of connecting the apparatus to the parts to be soldered while the latter are heating.

As used in the description and claims, the word "tube" is intended to define any hollow member capable of being soldered to another member by the broad process herein disclosed.

The scope of the invention is indicated in the appended claims.

I claim:

1. The method of soldering two metal parts together, one of said parts being a tube, which comprises clamping said parts in juxtaposition with solid solder therebetween, applying heat to the solder to melt the same, passing coolant through the tube while the heat is still being applied and after the solder has been melted to abstract heat from the solder faster than it is being applied whereby to cool and solidify the solder while maintaining the parts in juxtaposed clamped relationship, and subsequently releasing the clamping pressure from said parts while the solder is still in a solid state.

2. The method of soldering two metal parts together, one of said parts being a tube, which comprises clamping said parts in juxtaposition with solid solder therebetween by means of a clamp maintained at a temperature above the melting point of the solder, heating the solder above its melting point by heat from the clamp, passing coolant through the tube while the heat is still being applied and after the solder has been melted to abstract heat from the solder faster than it is being applied whereby to cool and solidify the solder while maintaining said parts in juxtaposed clamped relationship, and subsequently releasing the clamp from the parts while the solder is still in a solid state.

3. The method of soldering two parts together, one of said parts being a tube, which comprises clamping said parts in juxtaposed position with solder therebetween and simultaneously applying heat to the solder to melt the same, passing coolant through the tube while the heat is still being applied and after the solder has been melted to abstract heat from the solder faster than it is being applied whereby to cool and solidify the solder while maintaining the parts in juxtaposed clamped relationship, and subsequently releasing the clamping pressure from said parts while the solder is still in a solid state.

LESLIE D. BURTENSHAW.